Jan. 20, 1942.    C. A. DAVIS    2,270,699
DISPLACEMENT MEASURING APPARATUS
Filed Oct. 26, 1940    3 Sheets-Sheet 2
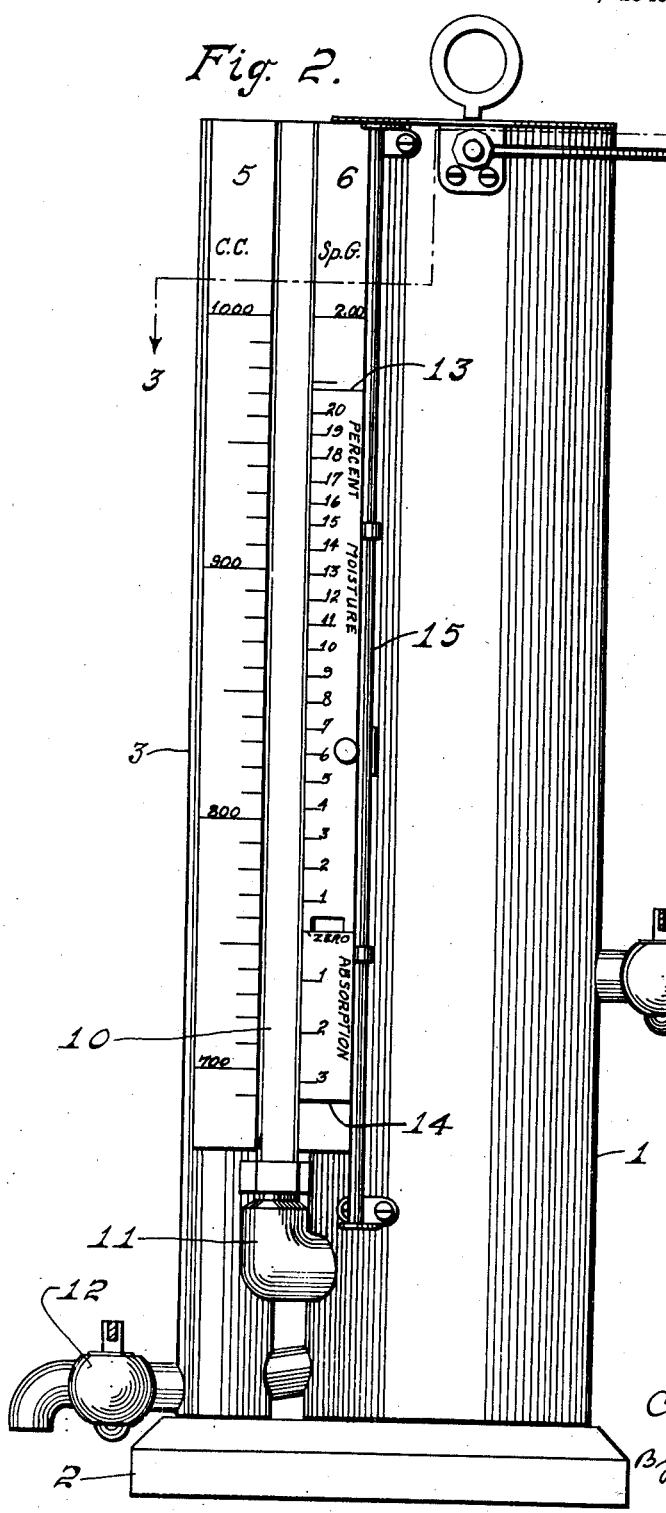
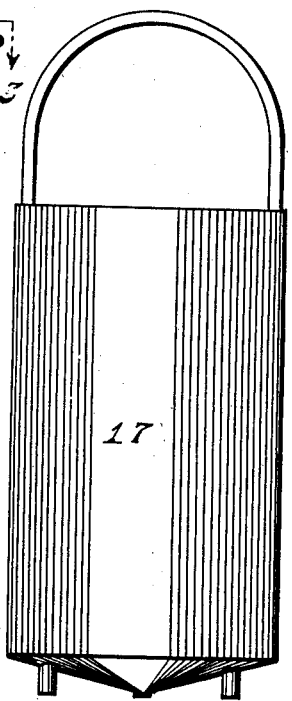
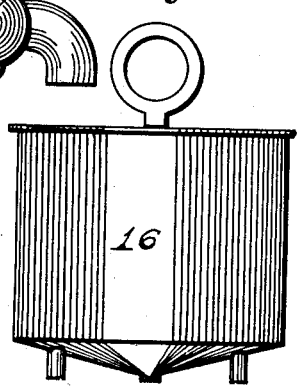
Inventor
Charles A. Davis
By Thomas W. J. Clark
his Attorney

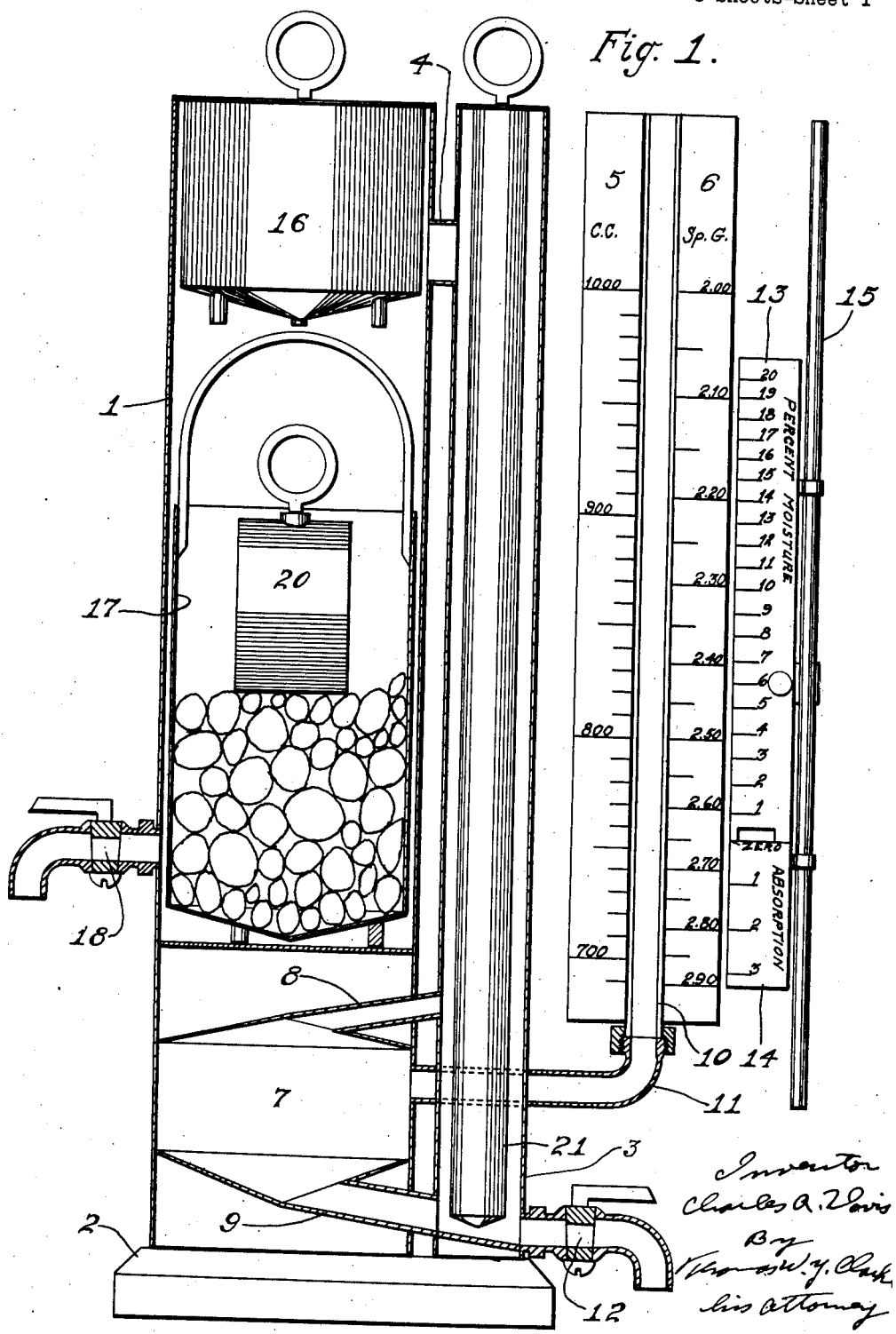

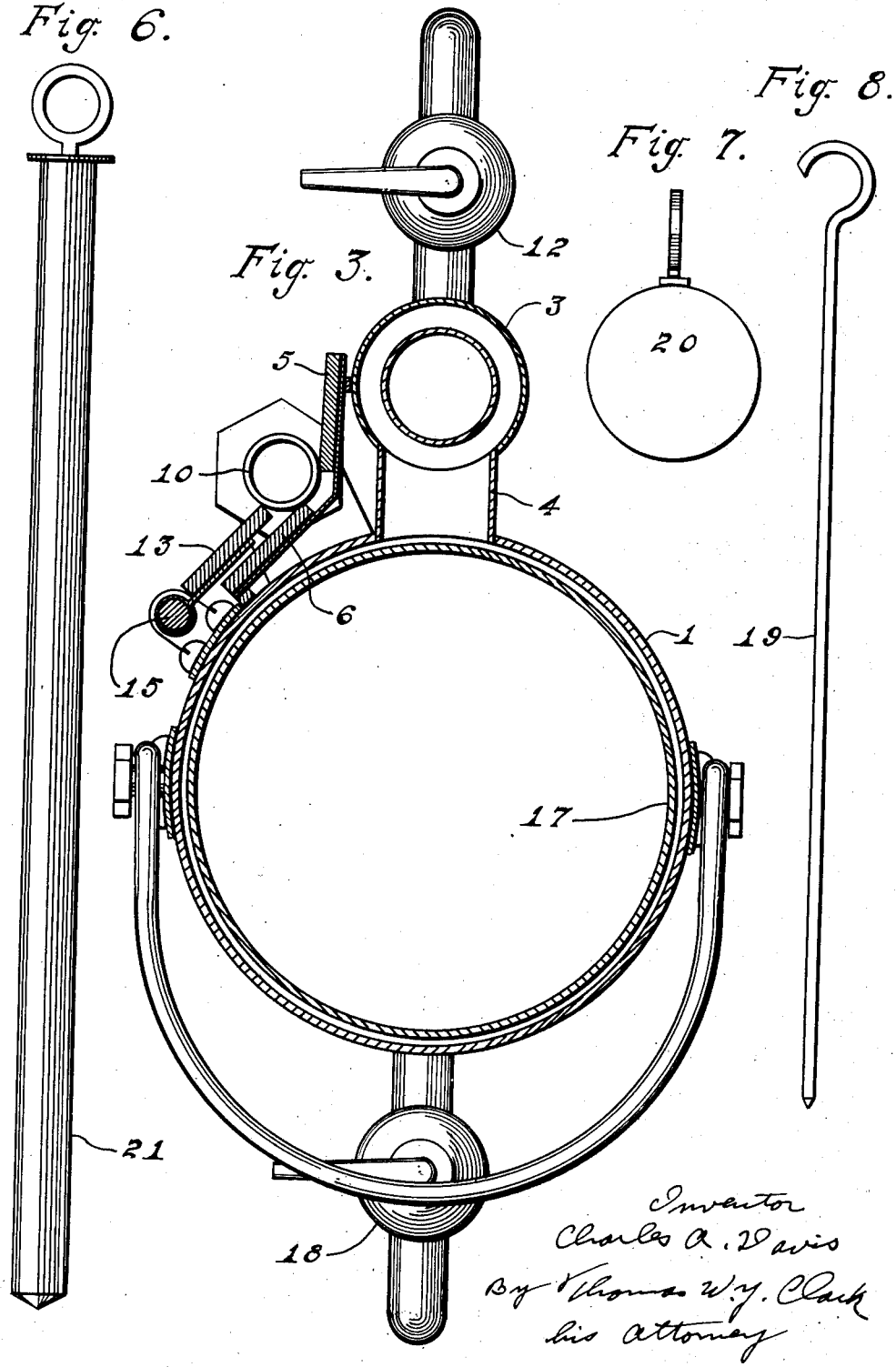

Patented Jan. 20, 1942

2,270,699

UNITED STATES PATENT OFFICE 2,270,699

DISPLACEMENT MEASURING APPARATUS

Charles A. Davis, Richmond, Va.

Application October 26, 1940, Serial No. 362,936

3 Claims. (Cl. 265—44)

This invention relates to an apparatus for determining the specific gravity of bulk materials and it is particularly adaptable for use in making quick determinations of the specific gravity of concrete and its constituents.

The objects of the invention are to make such an apparatus that can quickly be used for determining the specific gravity of any given aggregate. Another object is to design the apparatus so that it will be rigid and substantially indestructible even when used in the field or away from the laboratory. Another object of the invention is to make an apparatus which will be sufficiently accurate to be relied upon in actual operations and which can be used to this degree of accuracy quickly. Another object of the invention is to make an apparatus which may be used on a smaller sample than the large sample generally desired for obtaining an accurate test. Another object of the invention is to make a device which may be used with finely divided material as well as coarse aggregates. Other objects of the invention are to make an apparatus which will give the moisture content or the absorbing quality of materials being tested. Other objects and advantages of the invention will be apparent from the following description and the accompanying drawings in which:

Figure 1 is a somewhat diagrammatic view partly in section of a displacement measuring apparatus constructed and arranged in accordance with the invention.

Figure 2 is a side elevation of the apparatus.

Figure 3 is a plan view thereof partly in section on line 3—3 of Figure 2.

Figure 4 is a side elevation of a bucket in which material may be placed for insertion into the tank.

Figure 5 is a side elevation of a plunger designed to hasten the initial overflow.

Figure 6 is a side elevation of a space reducing rod.

Figure 7 is a front elevation of a space reducing weight.

Figure 8 is a side elevation of a stirring rod.

In the drawings similar numerals refer to similar parts throughout the several views.

Primarily the apparatus is designed to determine the specific gravity of bulk materials and it is designed and calibrated to receive predetermined weights of such material. Consequently the specific gravity, disregarding small variations due to temperature and barometric pressure, is equal to the weight of the material, which is taken at a fixed amount, divided by the weight of an equal volume of water. With the weight of material being constant the scale measuring the displacement of water can be rapidly graduated for a uniformly cylindrical container.

The apparatus illustrated is designed to receive 2000 grams of solid material. The cylindrical tank 1 is mounted on a base 2 and on this base and parallel with the tank is also mounted a tube 3. The tube 3 is connected with tank 1 by a passage 4. And below this passage tank 1 holds a predetermined amount of water on the basis of which the displacement scale 5 is graduated in cubic centimeters as is also specific gravity scale 6. Separated from the tank 1 but underneath it on the base 2 is a chamber 7 which is connected with tube 3 through connections 8 and 9.

This chamber 7 receives a considerable portion of the overflow from the tank 1 upon insertion of material into the tank. Of course tube 3 and the measuring tube 10 likewise receive portions of this overflow water. The measuring tube 10 is preferably connected to the chamber 7 by connection 11. Connection 8 leads from the chamber 7 at the top of the chamber so as to avoid the trapping of any air in the chamber. Connection 9 leads from the bottom of this chamber to the bottom of tube 3 and to valve 12 to permit the drain of the complete overflow system from this valve 12.

The device is also useful in measuring the percent of moisture or the absorption rate of any of the materials placed in the tank and scales 13 for measuring the moisture percent and 14 for measuring the absorption rate are mounted on rod 15 on the side of the tank. These scales can be slid up and down on this rod 15 and swung out of the way of the specific gravity scale as shown in Figure 3.

Time being an element in the displacement test of materials, a plunger 16 is utilized to facilitate the rapid overflow of the water from the tank 1 into the overflow system. While it is a fact that a constant level will eventually be reached in the tank 1 without the use of the plunger 16 it is not practical to rely on the judgment of the operator to decide when all the water has overflowed, that is above the level of connection 4. Tests utilizing this apparatus are often made in a concrete batching plant where vibration will cause the overflow to fluctuate.

Tests were conducted on the batching platform of a 1 cubic yard mixing and batching plant during its operation and it took 10 seconds for all the required water to overflow through connection 4 when using the plunger 16. This was most readily determined, as a test of the period of time, by closing the valve 12 and leaving some water in the overflow system, enough to come up to a given height in the measuring tube 10 on which the reading was obtained on a stationary platform. The same results can of course be obtained on a steady table invariably within this same period. After removing the plunger the tank could be tilted 20° in any direction without changing the reading on the gage.

On a steady table and without using the plunger 16 an accurate reading on the gage glass was not available under 8½ minutes, using still an additional known quantity of water for the overflow system and the results obtained on the mixing platform were so lacking in uniformity that no conclusion could be reached. The plunger increases the volume of water overflowing through the connection 4 to substantially fill the whole area of the connection 4 to thereby hasten the overflow, and also the last fraction of water overflowing through the connection 4 is much reduced in volume.

Although in an actual operation it is possible to use the apparatus without the bucket 17, this bucket adds greatly to the convenience of the device, and when using finely divided particles it adds greatly to the speed and accuracy of its use. Preferably the material is placed in bucket 17 and the bucket 17 in its position of rest is well below the overflow connection 4.

When the apparatus is used to test the specific gravity of finely divided materials such as sand, it is imperative that no air should be trapped between the particles of material and in running these tests the use of the bucket greatly facilitates the elimination of this air. The tank 1 has a valve 18 near its bottom and after the water has ceased to overflow tank 1, before the insertion of any material, an amount of the measured water can be drawn off in the bucket through valve 18. The sand or other finely divided material may be poured into the bucket and stirred by rod 19 to relieve the mass of any air, after which the bucket with its water and material is placed into the tank 1. The gages in their initial calibration allow for the displacement caused by the bulk of the bucket and the bucket may be placed into the tank 1 by the hook on top of the rod 19 without the hook causing any appreciable displacement of water.

In running a test, tank 1 is first filled with water and plunger 16 inserted with the valve 12 being open, and as soon as an equilibrium is obtained in the tank 1. so that no more water overflows, the valve 12 is closed. The plunger 16 is removed and the 2000 grams of material are placed in the bucket and the bucket is placed into tank 1 and the reading is taken. The cubic centimeters of displacement are observed on the scale 5 and the specific gravity of the specific material on scale 6. The moisture percent scale is previously calibrated to indicate percents of moisture of material of varying dry specific gravity and the dry specific gravity of the specific material must be known before making the moisture percent determination. The zero point of the moisture percent scale is then placed opposite the specific gravity of the dry material and in measuring the moisture in any given sample that percent will then be given on the moisture percent scale, because the displacement will be slightly more in exact proportion of the moisture percent in the sample.

Similarly when testing for absorption the specific gravity of the specific material is known and the absorption scale at its zero point is placed opposite that specific gravity on scale 6. If it is desired to ascertain the absorption of a given material at a given time, such as the time required to make and place concrete then the aggregate can be left in the bucket in the tank 1 for that given time and the absorption for that given time will be given on the scale 14. In performing this test, since the aggregate will absorb water up to the allotted time, it will be necessary to draw water from the valve 12 and pour it into the tank 1 and replace the plunger 16 in order to obtain the reading on the scale 14.

As above stated, the apparatus is designed for measuring the characteristics of a given weight of material, in this instance 2000 grams. Such a large sample will be required to obtain accurate results for materials having coarse particles but for materials having fine particles the elimination of air from those particles raises such a problem that the space displacement members, in the form of a weight 20 and rod 21, are utilized. The weight 20 and the rod 21 displace a given volume of water and as designed the apparatus is intended to use 1110 grams of the aggregate when using these members. The members reduce the volume contents to exactly the extent required for the scales to still be accurate for a 2000 gram sample. The weight 20 is also designed to exactly counterbalance on a scale the bucket 17, as a matter of convenience. The scale 5, however, will not be accurate with the use of this lesser weight of test material since it is graduated for 2000 grams of the sample and since with the displacement members the apparatus is designed to use 1110 grams. The cubic centimeters of displacement on the scale 5 will have to be multiplied by $1110/2000$ in order to get the correct volume in cubic centimeters of 1110 grams of the sample. The reading obtained on the scale 5 when using the smaller sample will be the displacement in terms of the 2000 grams sample. This being true it can be seen that calculations can be more conveniently executed on the basis of 2000 grams rather than 1110 grams. The specific gravity indicated by the scale 6 will be correct for either the large or small sample. When using the smaller sample the weight 20 functions to reduce the capacity of the tank 7 and the rod 21 to reduce the cross-sectional area of the tube 3, thereby effecting the same result as if the apparatus were designed for 1110 grams instead of 2000 grams. The gages 13 and 14 are used in the same manner as previously described regardless of whether the large or small sample is used.

The apparatus may be used for the determination of the suggested characteristics of substantially any material, such as coarse and fine aggregates for concrete, wet mixed concrete, hardened concrete, soil samples and the like.

It will be apparent that various modifications in the construction may be made without departing from the invention and what is claimed as new and is desired to be secured by Letters Patent is:

1. Apparatus for determining the specific gravity of bulk materials comprising an open top tank to receive liquid and then a predetermined weight of material, an overflow system, a connection between the tank at a predetermined liquid containing level thereof and the system, said connection being below the top of the tank, and a plunger placeable into the top of said tank a fixed distance thereby tending to expel liquid therefrom above said connection and into the system, said system having a drain valve at the lower part thereof to relieve the apparatus of all but the measured quantity of liquid in the tank, the placing of material into the tank causing a liquid overflow into said system and means to indicate the amount of overflow from the tank upon the placing of material thereinto.

2. Apparatus for determining the specific gravity of bulk materials comprising an open top tank to receive liquid and then a predetermined weight of material, an overflow system, a connection between the tank at a predetermined liquid containing level thereof and the system, the placing of material into the tank causing a liquid overflow into said system, said system comprising a chamber at the lower portion thereof, a tube between said tank connection and chamber and connections between the tube and the top and bottom of the chamber, and a drain valve at the lower part of the system to relieve the apparatus of all but the measured quantity of liquid in the tank, and means to indicate the amount of overflow from the tank upon the placing of material thereinto.

3. Apparatus for determining the specific gravity of bulk materials comprising an open top tank to receive liquid and then a predetermined weight of material, an overflow system, a connection between the tank at a predetermined liquid containing level thereof and the system, the placing of material into the tank causing a liquid overflow into said system, said system including a tube extending downwardly from said connection and a drain valve at the lower part of the system to relieve the apparatus of all but the measured quantity of liquid in the tank, means to indicate the amount of overflow from the tank upon the placing of material into the tank and displacing members of predetermined displacement placeable in said tank and tube when testing a sample of material of predetermined weight less than that for which the apparatus is adapted.

CHARLES A. DAVIS.